United States Patent [19]

McCrary, Jr.

[11] 4,193,284

[45] Mar. 18, 1980

[54] CAME CUTTING AND MOLDING TOOL AND METHOD OF USING SAME

[76] Inventor: Nathan O. McCrary, Jr., 4018 Baughman, Ames, Iowa 50010

[21] Appl. No.: 924,167

[22] Filed: Jul. 13, 1978

[51] Int. Cl.² ........................ B26B 17/04; B23D 29/02

[52] U.S. Cl. ...................................... 72/325; 29/566.1; 30/193; 72/409

[58] Field of Search .......................... 72/325, 331, 409; 7/132, 133; 29/566.1; 30/175, 178, 191, 193, 357, 179; 81/425 R, 426; 30/92, 116; 83/580, 581, 679

[56] References Cited

U.S. PATENT DOCUMENTS

| | | | |
|---|---|---|---|
| 1,388,398 | 8/1921 | Adams | 7/133 |
| 2,632,245 | 3/1953 | De Garmo | 30/193 |
| 4,106,195 | 8/1978 | Berg | 30/179 |

OTHER PUBLICATIONS

Creating with Stained Glass, Gick Publishing Co., 1976, pp. 25, 26.

*Primary Examiner*—Michael J. Keenan
*Attorney, Agent, or Firm*—Zarley, McKee, Thomte, Voorhees & Sease

[57] ABSTRACT

Came is cut and molded by a tool having oppositely disposed cutting blades with oppositely disposed faces one of which is flat while the opposite is beveled such that a piece of came being cut produces a right-angle end on one piece and a pair of beveled surfaces on the other piece.

5 Claims, 7 Drawing Figures

CAME CUTTING AND MOLDING TOOL AND METHOD OF USING SAME

BACKGROUND OF THE INVENTION

The art of making stained glass windows involves cutting and shaping pieces of lead came around the pieces of cut glass arranged in a predetermined pattern. Cutting of the came pieces heretofore has been done by conventional knives. The came may be I, H, or U-shaped in cross section and have widths of 3/16ths inch to ⅝ inch or larger.

The cutting of came by use of knives is cumbersome, time-consuming and inconvenient particularly where beveled end surfaces are desired for use in making mitered joints. Accordingly, a hand-operated tool is desired that will produce quickly and simply right-angle ends and beveled end surfaces on came pieces.

SUMMARY OF THE INVENTION

A pair of crossed handle members are pivotally interconnected at their crossing and include cutting blades on their outer ends. The cutting blades have oppositely disposed faces with the face on one side including flat coplanar surfaces while the face on the opposite side is formed by flat beveled surfaces which extend away from the cutting edges and the coplaner surfaces on the flat side of the blades.

The tool is operated by placing a piece of came between and across the cutting edges of the blades whereupon the blades are closed with the coplanar surfaces producing by cutting action a right angle end flat surface on one piece and the beveled surfaces producing by molding of the came material oppositely disposed beveled surfaces on a second piece.

It is thus seen that came pieces may be cut and shaped quickly with a simple tool which is hand operated and pieces having right-angle end surfaces or beveled end surfaces result in a single cutting operation.

DESCRIPTION OF THE PREFERRED EMBODIMENT

Figure 1:
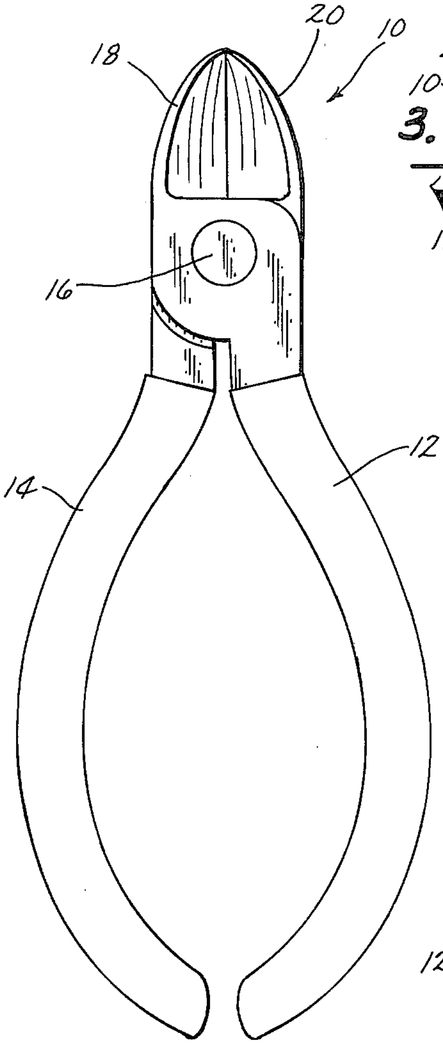
FIG. 1 is a plan view of the came cutting and molding tool of this invention as viewed from the side having the beveled surfaces on the cutting blades.
Figure 2:
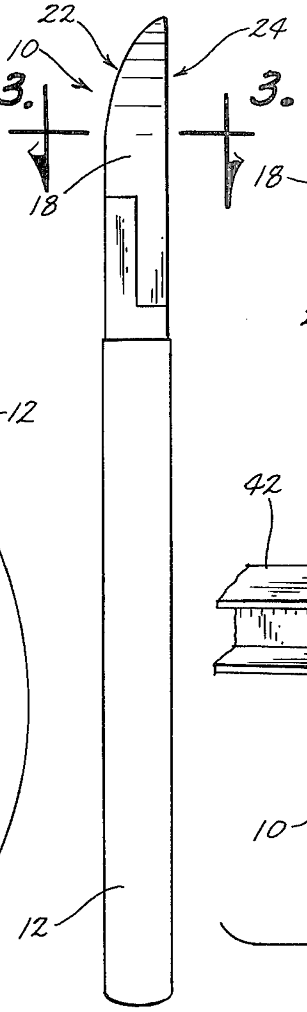
FIG. 2 is a side view thereof.
Figure 3:
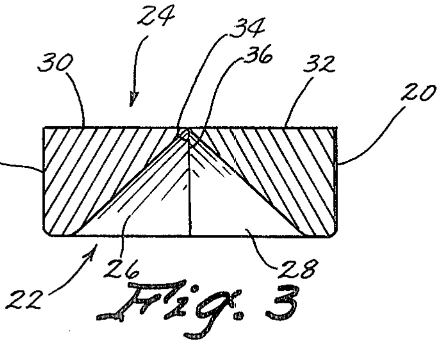
FIG. 3 is a cross-sectional view taken along line 3—3 in FIG. 2.

The came cutting and molding tool of this invention is referred to generally in FIG. 1 by the reference numeral 10 and includes a pair of crossed handle members 12 and 14 pivotally interconnected by a pin 16 at the crossing of the handle members. A pair of cutting blades 18 and 20 are provided on the outer ends of the handle members 12 and 14 and as seen in FIG. 2, include oppositely disposed faces 22 and 24. In FIG. 3 the face 22 is seen to comprise beveled flat surfaces 26 and 28 which taper away from oppositely disposed flat coplanar surfaces 30 and 32. The beveled surfaces also taper away from cutting edges 34 and 36.

Figure 4:
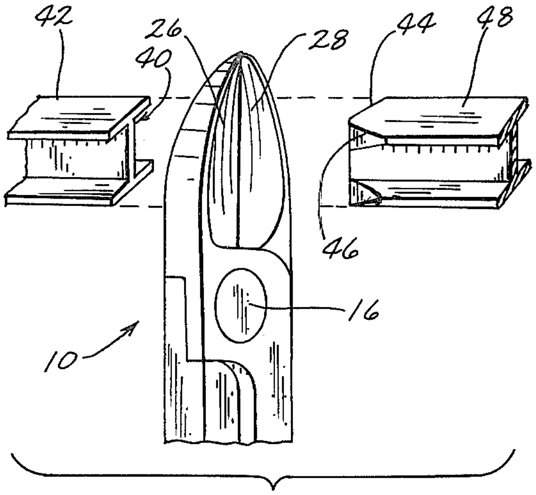
FIG. 4 is an exploded fragmentary perspective view of the tool in operation cutting a length of lead came to produce a right-angled end piece and a piece having a pair of beveled surfaces on one end.

Thus in operation it is seen in FIG. 4 that the coplanar surfaces 30 and 32 produce a flat right-angled end surface 40 on a piece of came 42 while the beveled surfaces 26 and 28 produce a pair of beveled end surfaces 44 and 46 on a piece of came 48. It is seen that the right-angle surface 40 on the piece 42 is produced by cutting only resulting from the cutting edges 34 and 36 coming together while the beveled surfaces 44 and 46 on the came piece 48 result from deformation of the lead material downwardly, upwardly and rearwardly along the came piece 48 and result from the blade surfaces 26 and 28 displacing the lead as the blades 18 and 20 come together.

Figure 5:
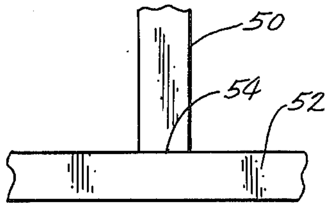
FIG. 5 is a fragmentary plan view of a pair of came pieces in a butt joint.
Figure 6:
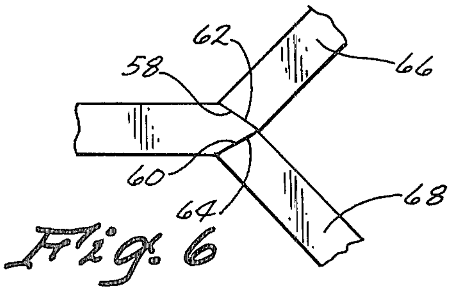
FIG. 6 is a plan view of three came pieces in a mitered joint.
Figure 7:
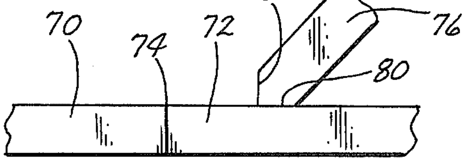
FIG. 7 is a plan view of three came pieces in butt and mitered joints.

The uses of the came pieces, as shown in FIG. 5–7, are representative with pieces 50 and 52 in FIG. 5, being in a butt joint with piece 50 having a right-angle surface 54. In FIG. 6 a piece 56 with tapered end surfaces 58 and 60 engage right-angle surfaces 62 and 64 on pieces 66 and 68. In FIG. 7, a piece 70 abutts a piece 72 in a butt joint 74 while a piece 76 having tapered or beveled surfaces 78 and 80, engage piece 72 along beveled surface 80.

It is unerstood that any desired angle cut may be accomplished on the end of a piece of lead came by utilizing the face 24 having coplanar surfaces 30 and 32. Furthermore, this side of the tool can be used for trimming the ends of came pieces without crushing the came and thereby allow came pieces to be fitted together in accordance with any given pattern or design.

It is thus seen that lead came pieces used in production of stained glass windows may be quickly cut and molded with a hand tool to prouce the desired end configuration whether it be a right-angle end or a beveled or tapered end.

I claim:

1. A method of molding came for glazing for cut glass pieces, by cutting a length of came into two pieces, one piece having a right-angle butt end surface and the other piece having oppositely disposed beveled end surfaces said method comprising, employing a cutting and molding tool having oppositely disposed cutting blades, each blade having oppositely disposed surfaces, the surfaces on one side of said blades being flat to provide a right angle butt end cut while the surfaces on the opposite side are beveled away from the cutting edges of the blades and the opposite flat side of said blades to provide a beveled cut, placing a length of came material between and across the open blades of said tool, and closing the blades of said tool onto said material until said blades touch the flat surfaces on said one side of said blades producing by cutting a piece of came having a right-angle butt end surface and the beveled surfaces of said other side of said blades producing by molding a piece of came having a pair of beveled end surfaces which together form a V-shaped end.

2. A came cutting and molding tool comprising, a pair of oppositely disposed cutting blades having cooperating cutting edges, said cutting edges being straight and continuous over the substantial length of said blades, each of said blades having oppositely disposed surface means, the surface means on one side of said blades being flat and coplanar over the substantial area of said blades for producing by cutting a piece of came having a right-angle butt end surface and the surface means on the opposite side being flat over a substantial area of said blade and beveled away from the cutting edges of the blades and the opposite flat side of said blades for producing by molding a piece of came having a pair of beveled end surfaces which together form a V-shaped end upon closing the blades of said tool onto a length of came material until said blades touch, said blades being free of any obstruction on either side thereof to allow for an elongated piece of came to be positioned across and between said cutting blades, and means operatively connected to said blades for opening and closing said blades.

3. The structure of claim 2 wherein said means for opening and closing said blades is further defined as being a pair of crossed handle members connected to said blades and being pivotally connected together at their crossing.

4. The structure of claim 3 wherein the blade associated with each handle member is formed as an integral portion of said member.

5. The structure of claim 4 wherein the side of said cross handle members associated with the side of said tool having said flat blades, lie in coplanar relationship.

* * * * *